United States Patent
Durali et al.

(10) Patent No.: US 10,259,899 B2
(45) Date of Patent: Apr. 16, 2019

(54) VINYLIDENE FLUORIDE / 2,3,3,3-TETRAFLUOROPROPENE COPOLYMERS

(75) Inventors: Mehdi Durali, Carlsbad, CA (US); David A. Mountz, Exton, PA (US)

(73) Assignee: ARKEMA INC., King of Prussia, PA (US)

( * ) Notice: Subject to any disclaimer, the term of this patent is extended or adjusted under 35 U.S.C. 154(b) by 0 days.

(21) Appl. No.: 13/001,891

(22) PCT Filed: Jun. 18, 2009

(86) PCT No.: PCT/US2009/047771
§ 371 (c)(1),
(2), (4) Date: Dec. 29, 2010

(87) PCT Pub. No.: WO2010/005757
PCT Pub. Date: Jan. 14, 2010

(65) Prior Publication Data
US 2011/0097529 A1    Apr. 28, 2011

Related U.S. Application Data

(60) Provisional application No. 61/078,497, filed on Jul. 7, 2008.

(51) Int. Cl.
| | | |
|---|---|---|
| B32B 1/08 | (2006.01) |
| C08F 214/22 | (2006.01) |
| C08F 214/18 | (2006.01) |
| B01D 67/00 | (2006.01) |
| B01D 71/32 | (2006.01) |
| B01D 71/34 | (2006.01) |
| B01D 71/76 | (2006.01) |

(52) U.S. Cl.
CPC ........ *C08F 214/22* (2013.01); *B01D 67/0009* (2013.01); *B01D 71/32* (2013.01); *B01D 71/34* (2013.01); *B01D 71/76* (2013.01); *Y10T 428/139* (2015.01)

(58) Field of Classification Search
CPC ............ Y10T 428/13; Y10T 428/1307; Y10T 428/1317; Y10T 428/139; Y10T 428/1352; Y10T 428/1393; Y10T 428/1397; C08F 214/00; C08F 214/218; C08F 214/22

USPC .............. 525/55; 526/89, 222, 225, 249; 428/335–337, 420, 421, 480, 522, 35.2, 428/35.7–35.9, 36.9–36.92
See application file for complete search history.

(56) References Cited

U.S. PATENT DOCUMENTS

| | | | |
|---|---|---|---|
| 2,970,988 A * | 2/1961 | Lo ................................. | 526/249 |
| 3,085,996 A | 4/1963 | Lo | |
| 3,493,530 A | 2/1970 | Sianesi et al. | |
| 4,585,306 A | 4/1986 | Ohmori et al. | |
| 4,615,943 A * | 10/1986 | Sakagami et al. ............ | 428/332 |
| 5,139,878 A * | 8/1992 | Kim et al. .................... | 428/421 |
| 5,140,082 A | 8/1992 | Watanabe et al. | |
| 6,403,744 B1 | 6/2002 | Akama et al. | |
| 6,649,720 B2 | 11/2003 | Amin-Sanavei et al. | |
| 6,750,304 B2 | 6/2004 | Kaspar et al. | |
| 6,861,490 B2 | 3/2005 | Kaspar et al. | |
| 7,375,157 B2 | 5/2008 | Amos et al. | |
| 7,553,540 B2 * | 6/2009 | Debergalis et al. .......... | 428/335 |
| 8,163,858 B2 | 4/2012 | Samuels et al. | |
| 2007/0106010 A1* | 5/2007 | Hedhli et al. ................. | 524/544 |
| 2008/0153977 A1 | 6/2008 | Samuels et al. | |
| 2008/0153978 A1* | 6/2008 | Samuels et al. ................ | 525/55 |
| 2008/0171844 A1* | 7/2008 | Samuels et al. .............. | 526/255 |

FOREIGN PATENT DOCUMENTS

| | | | |
|---|---|---|---|
| EP | 0456019 B2 * | 11/1991 | ............ C08F 214/28 |
| GB | 827308 | 2/1960 | |
| JP | 63284250 | 11/1988 | |
| JP | 9288915 | 11/1997 | |
| JP | 10310712 | 11/1998 | |
| JP | 2002020409 | 1/2002 | |
| WO | WO 2008/079986 | 7/2008 | |
| WO | WO 2010/005755 | 1/2010 | |
| WO | WO 2010/005757 | 1/2010 | |

OTHER PUBLICATIONS

Fine chemical engineering technology (second edition), Edited by Li, Heping, Beijing Science Press, second edition, Jan. 2007, p. 352.
Introduction to Polymer Materials, edited by Han, Dongbing et al., China Petrochemical Press, first edition, Sep. 2003, p. 192.
Wikipedia "Normal, Pipe Size".

* cited by examiner

*Primary Examiner* — Lee E Sanderson
(74) *Attorney, Agent, or Firm* — Thomas Roland

(57) ABSTRACT

This invention relates to copolymer compositions of poly (vinylidene fluoride-2,3,3,3-tetrafluoropropene) copolymers. The copolymers formed have excellent optical properties, corrosion resistance and electrical properties, with very low haze. Tetrafluoropropene monomer units may be present at from 0.5 to 60 weight percent of the copolymer.

4 Claims, No Drawings

VINYLIDENE FLUORIDE / 2,3,3,3-TETRAFLUOROPROPENE COPOLYMERS

FIELD OF THE INVENTION

This invention relates to copolymer compositions of poly (vinylidene fluoride-2,3,3,3-tetrafluoropropene) copolymers. The copolymers formed have excellent optical properties, corrosion resistance and electrical properties, with very low haze. Tetrafluoropropene monomer units may be present at from 0.5 to 60 weight percent of the copolymer.

BACKGROUND OF THE INVENTION

Polyvinylidene fluoride (PVDF) is a chemically resistant engineering plastic. PVDF and its copolymers have been used in many high performance applications. While PVDF films can be made to be transparent, they still have some degree of haziness, producing a product that is less than optically clear. There is a need for an optically clear PVDF or PVDF copolymer that retains the chemical resistance of PVDF U.S. Pat. No. 5,140,082 discloses a vinylidene fluoride/ trifluoromethyl ethylene copolymer (3,3,3-trifluoropropene) (TFP). Synthesis by solution, suspension and emulsion polymerization are described, with all the TFP in the initial charge. The copolymer has excellent weather resistance, corrosion resistance and electrical characteristics. The reference is silent on optical clarity.

2,3,3,3-tetrafluoropropene copolymers have been formed with other monomers, as described for example in JP 10310712, JP 09288915, JP 63284250, and JP 58164609.

There is a desire to form copolymers of 2,3,3,3-tetrafluoropropene and vinylidene fluoride, to take advantage of properties that can be brought by polymers of these monomers.

Surprisingly it has now been found that copolymers of vinylidene fluoride and 2,3,3,3-tetrafluoropropene having a wide range of 2,3,3,3-tetrafluoropropene levels can be synthesized to produce copolymers having excellent optical properties. Additionally films of the copolymer are extremely flexible and tough, and have a high melting point.

Interestingly, copolymers of vinylidene fluoride and (2,3,3,3 tetrafluoropropene) were found to form much more readily than those of vinylidene fluoride-3,3,3 trifluoropropene. While not being bound by any particular theory, it is believed that the existence of (tertiary) hydrogen on 3,3,3 trifluoropropene structure inhibits copolymerization reaction causing process delays and increase in initiator usage which in turn adversely affect product quality. In the 2,3,3,3 tetrafluoropropene structure, on the other hand, (tertiary) hydrogen is replaced by a fluorine atom eliminating reaction inhibition. Comparable copolymerization reactions shows a large decrease in reaction time and initiator usage for vinylidene fluoride-2,3,3,3 tetrafluoropropene polymerization compared to vinylidene fluoride-3,3,3 trifluoropropene reactions. Further, there is significant improvement in product color (by heat pressed plaques) for the 2,3,3,3 tetrafluoropropene copolymer.

SUMMARY OF THE INVENTION

The invention relates to a copolymer composition having 0.5 to 60 weight percent of 2,3,3,3-tetrafluoropropene monomer units and 40 to 99.5 weight percent of vinylidene fluoride monomer units. The copolymer composition is optically clear.

DETAILED DESCRIPTION OF THE INVENTION

The invention relates to vinylidene fluoride-2,3,3,3-tetrafluoropropene copolymers containing from 0.5%-60 wt. percent of 2,3,3,3-tetrafluoropropene (TetFP), and preferably from 2.0 to 40 wt. percent. The copolymer is optically clear.

By "optically clear" as used herein means a material having a haze level of less than 30 percent when measured by ASTM D1003-07 Standard Test Method for Haze and Luminous Transmittance of Transparent Plastics, and a light transmission of >85%, and preferably greater than 90 percent, when measured by ASTM D1003-07.

By "copolymer" as used herein is meant a polymer containing 0.5 to 60 weight percent of TetFP monomer units and from 40 to 99.5 weight percent of vinylidene fluoride monomer units. Preferably the level of TetFP is from 2-36 weight percent. Copolymers, containing only TetFP and VDF are preferred. However, low levels (up to 20 weight percent, and preferably up to 10 weight percent) of one or more other copolymerizable monomers may be present. These copolymerizable monomers include, but are not limited to tetrafluoroethylene, trifluoroethylene, chlorotrifluoroethylene, vinyl fluoride, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), perfluoromethyl vinyl ether, and perfluoropropyl vinyl ether. The copolymers formed may be heterogeneous or homogeneous, and may be star, branch random or block in architecture.

The VDF/TetFP copolymers can be made by any polymerization method, including batch or semi-batch, and may be formed by emulsion, reverse emulsion, suspension or solution polymerization. Preferably, the copolymers are made by an emulsion process.

In an emulsion polymerization process, a reactor is charged with deionized water, water-soluble surfactant capable of emulsifying the reactant mass during polymerization and paraffin antifoulant. The mixture is stirred and deoxygenated.

A predetermined amount of chain transfer agent is then introduced into the reactor, the reactor temperature raised to the desired level and vinylidene fluoride (VDF) or VDF combined with other fluoromonomers fed into the reactor. Once the initial charge of monomer/monomers is introduced and the pressure in the reactor has reached the desired level, an initiator emulsion/solution is introduced to start the polymerization reaction. The temperature of the reaction can vary depending on the characteristics of the initiator used and one of skill in the art will know how to do so. Typically the temperature will be from about 60° to 120° C., preferably from about 70° to 110° C.

Similarly, the polymerization pressure may vary, but, typically it will be within the range 40 to 50 atmospheres. Following the initiation of the reaction, the monomer/monomers are continuously fed along with additional initiator to maintain the desired pressure. All feeds will then be stopped.

Residual gases (containing unreacted monomers) are vented and the latex recovered from the reactor. The polymer may then be isolated from the latex by standard methods, such as, acid coagulation, freeze thaw or high shear.

Any compound capable of generating active radicals at the selected reaction temperature can be used as initiator in this invention. The choice initiator can be selected, for example, from: inorganic peroxide salts, including for instance sodium, potassium or ammonium persulfate; dialkylperoxides including for instance di-t-butyl peroxide (DTBP); dialkylperoxydicarbonates, such as for instance diisopropyl-peroxydicarbonate (IPP), di-N-propyl-peroxy-dicarbonate (NPP), di-sec-butyl-peroxydicarbonate (DBP); t-alkylperoxybenzoates; t-alkyperoxypivalates including for instance t-butyl and t-amylperpivalate; acetylcyclohexane-sulphonyl peroxide; dibenzoyl peroxide; dicumylperoxide. Redox systems including combinations of oxidants such as hydrogen peroxide, t-butyl hydroperoxide, cumene hydroperoxide, or persulfate, and reductants such as reduced metal salts, iron (II) salts being a particular example, optionally combined with activators such as sodium formaldehyde sulfoxylate, metabisulfite, or ascorbic acid.

The surfactants and emulsifiers are typically used in an amount from about 0.02 to about 1.0 weight percent on total monomer. Preferably they are used in an amount from about 0.05 to about 0.5 weight percent on total monomer. The surfactants may be used in solution such as in aqueous solution for convenient handling. Surfactants useful in the present invention include fluorosurfactants such as salts of the acids of the formula X (CF2)nCOOM, wherein X is hydrogen or fluorine, M is an alkali metal, ammonium, substituted ammonium (e.g., alkylamine of 1 to 4 carbon atoms), or quaternary ammonium ion, and n is an integer from 6 to 20; sulfuric acid esters of polyfluoroalkanols of the formula X (CF2)nCH2OSO3M, where X and M are as above; and salts of the acids of the formula CF3(CF2)n (CX2)mSO3M, where X and M are as above; n is an integer from 3 to 7, and m is an integer from 0 to 2, such as in potassium perfluoroctyl sulfonate. The use of a microemulsion of perfluorinated polyether carboxylate in combination with neutral perfluoropolyether in vinylidene fluoride polymerization can be found in EP0816397A1 and EP722882. The surfactants useful for the purpose of this invention could also be from non-fluorinated surfactants including for instance 3-allyloxy-2-hydroxy-1-propane sulfonic acid salt, polyvinylphosphonic acid, polyacrylic acids, polyvinyl sulfonic acid, and salts thereof polyethylene glycol and/or polypropylene glycol and the block copolymers thereof, alkyl phosphonates or siloxane-based surfactants.

Chain-transfer agents are added to the polymerization to regulate the molecular weight of the product. The amount and mode of addition of chain-transfer agent depend on the activity of the particular chain-transfer agent employed, and on the desired molecular weight of the polymer product. The amount of chain-transfer agent added to the polymerization reaction is preferably from about 0.05 to about 5 weight percent, more preferably from about 0.1 to about 2 weight percent based on the total weight of monomer added to the reaction mixture. Examples of chain transfer agents useful in the present invention include: oxygenated compounds such as alcohols, carbonates, ketones, esters, and ethers may serve as chain-transfer agents. Ethane, propane, and halocarbons and hydrohalocarbons, such as chlorocarbons, hydrochlorocarbons, chlorofluorocarbons and hydrochlorofluorocarbons may also be used as chain transfer agents.

A paraffin antifoulant is optional, and any long-chain, saturated, hydrocarbon wax or oil may be used. Reactor loadings of the paraffin typically are from 0.01% to 0.3% by weight on the total monomer weight used.

Generally, the emulsion latex contains from about 10 to about 50 weight percent copolymer solids. The copolymer in the latex is in the form of small particles having a size range of from about 30 nm to about 500 nm.

The copolymers of the invention have a weight average molecular weight of from 50,000 to 1,000,000.

The VDF/TetFP copolymers of the invention have unique properties, which can be exploited in many applications. The copolymers of the invention have excellent optical clarity, electrical properties, corrosion and weathering resistance and can easily be handled by typical melt processing equipment.

These properties of the VDF/TetFP copolymers makes them excellent candidates for many applications. One of skill in the art could imagine many uses, based on the list of properties and examples provided in this application. Some useful application include, but are not limited to:

1. High clarity films. The films could be placed over lenses and other optical equipment to provide excellent chemical protection and dirt-shedding.
2. High temperature flexible clear tubes.
3. Similarly, the high melting point, optical clarity and chemical resistance make these copolymers ideal for clear see-through industrial windows, glasses, pipes, and level indicators
4. Specialty films, such as for solar panels, piezoelectric applications and capacitors.
5. Fuel cell membranes. They have similar mechanical properties to VDF-HFP copolymers, while maintaining a higher melting point that is useful for resistance to creep in the electrode assembly.
6. Clear, tough coatings.
7. Tough films and large blown objects, due to the high melt strength of the copolymer.

EXAMPLES

Comparative Example 1

This example teaches the process for preparation of vinylidene fluoride-3,3,3 trifluoropropene copolymers.

Into a 1-liter stainless steel reactor was charged 700 g of deionized water, 100 g of an aqueous surfactant solution containing 1 g ammonium perfluorooctonoate and 0.5 g granular paraffin wax. Following 4 cycles of pressurization to 40 psi with Helium and depressurization of the reactor, agitation was begun at 90 rpm and the reactor was heated to 100 degree C. After reactor temperature reached the desired set point reactor pressure was then raised to 650 psi by charging about 106 g Vinylidene fluoride and 14.8 g 3,3,3 trifluoropropene into the reactor. After reactor pressure was stabilized, 177.9 g of a potassium persulfate/sodium acetate solution was added to the reactor to initiate polymerization. The initiator solution was 2.0 wt. % potassium persulfate and 2.0 wt. % sodium acetate in deionized water. The Vinylidene fluoride-3,3,3 trifluoropropene copolymerization was continued until the desired amount of monomers was introduced in the reaction mass. After 66 min feed of monomers were stopped where a total of 397 g Vinylidene fluoride and 56.8 g 3,3,3 trifluoropropene were charged into the reactor. Initiator feed was continued for another 20 min. The total initiator usage was 206.4 g. At this point initiator feed was stopped and reactor was held under agitation at 90 rpm and 100 C for another 10 minutes. Reactor was then cooled to 50° C. and the surplus monomers were vented.

Reactor was held at this temperature for another 10 min. The temperature was dropped to 25° C. and the latex recovered. The solid content of the latex measured gravimetrically was 31.6 wt. %. The polymer was isolated by oven drying. The 3,3,3 trifluoropropene content was measured at 11.3 wt. % by fluorine NMR. The degree of crystallinity of the copolymer measured by DSC was 31.5%.

Example 2

Into a 2-liter stainless steel reactor was charged 700 g of deionized water, and 4 gammonium perfluorooctonoate. Following 5 cycles of pressurization to 40 psi with Helium and depressurization of the reactor, agitation was begun at 83 rpm and the reactor was heated to 110° degree C. After reactor temperature reached the desired set point reactor pressure was then raised to 650 psi by charging about 123 g (vinylidene fluoride) VDF and 25 g 2,3,3,3 tetrafluoropropene into the reactor. After reactor pressure was stabilized, 15.6 g of a potassium persulfate/sodium acetate solution was added to the reactor to initiate polymerization. The initiator solution was 2.0 wt. % potassium persulfate and 2.0 wt. % sodium acetate in deionized water. The VDF-2,3,3,3 tetrafluoropropene copolymerization was continued until the desired amount of monomers was introduced in the reaction mass. After 15 min feed of monomers were stopped where a total of 241 g VDF and 43 g 2,3,3,3 tetrafluoropropene were charged into the reactor. Initiator feed was continued for another 15 min. The total initiator usage was 38.6 g. At this point initiator feed was stopped and reactor was held under agitation at 83 rpm and 110° C. for another 15 minutes. Reactor was then cooled to 35° C. and the surplus monomers were vented and the latex recovered. The solid content of the latex measured gravimetrically was 27.5 wt. %. The polymer was isolated by oven drying. The 2,3,3,3 tetrafluoropropene content was measured at 11.5 wt. % by fluorine NMR. The degree of crystallinity of the copolymer measured by DSC was 33.9%.

Example 3

Into a 2-liter stainless steel reactor was charged 700 g of deionized water, and 4 g ammonium perfluorooctonoate. Following 5 cycles of pressurization to 40 psi with Helium and depressurization of the reactor, agitation was begun at 83 rpm and the reactor was heated to 110° C. After reactor temperature reached the desired set point reactor pressure was then raised to 650 psi by charging about 107 g VDF and 36 g 2,3,3,3 tetrafluoropropene into the reactor. After reactor pressure was stabilized, 8.5 g of a potassium persulfate/sodium acetate solution was added to the reactor to initiate polymerization. The initiator solution was 2.0 wt. % potassium persulfate and 2.0 wt. % sodium acetate in deionized water. The VDF-2,3,3,3 tetrafluoropropene copolymerization was continued until the desired amount of monomers was introduced in the reaction mass. After 40 min feed of monomers were stopped where a total of 239 g VDF and 80 g 2,3,3,3 tetrafluoropropene were charged into the reactor. Initiator feed was continued for another 15 min. The total initiator solution usage was 30.5 g. At this point initiator feed was stopped and reactor was held under agitation at 83 rpm and 110° C. for another 15 minutes. Reactor was then cooled to 35° C. and the surplus monomers were vented and the latex recovered. The solid content of the latex measured gravimetrically was 27.5 wt. %. The polymer was isolated by oven drying. The 2,3,3,3 tetrafluoropropene content was measured at 24.4% by fluorine NMR. The degree of crystallinity of the copolymer measured by DSC was 15.9%.

Example 4

Into a 2-liter stainless steel reactor was charged 700 g of deionized water, and 4 g ammonium perfluorooctonoate. Following 5 cycles of pressurization to 40 psi with Helium and depressurization of the reactor, agitation was begun at 83 rpm and the reactor was heated to 83 C. After reactor temperature reached the desired set point reactor pressure was then raised to 650 psi by charging about 140 g VDF and 28 g 2,3,3,3 tetrafluoropropene into the reactor. After reactor pressure was stabilized, 10 g of a potassium persulfate/sodium acetate solution was added to the reactor to initiate polymerization. The initiator solution was 0.5 wt. % potassium persulfate and 0.5 wt. % sodium acetate in deionized water. The VDF-2,3,3,3 tetrafluoropropene copolymerization was continued until the desired amount of monomers was introduced in the reaction mass. After 164 min feed of monomers were stopped where a total of 260 g VDF and 47 g 2,3,3,3 tetrafluoropropene were charged into the reactor. Initiator feed was continued for another 15 min. The total initiator solution usage was 28 g. At this point initiator feed was stopped and reactor was held under agitation at 83 rpm and 83° C. for another 15 minutes. Reactor was then cooled to 35° C. and the surplus monomers were vented and the latex recovered. The solid content of the latex measured gravimetrically was 11.1 wt. %.

Example 5

Into a 2-liter stainless steel reactor was charged 700 g of deionized water, and 4 g ammonium perfluorooctonoate. Following 5 cycles of pressurization to 40 psi with Helium and depressurization of the reactor, agitation was begun at 83 rpm and the reactor was heated to 83 C. After reactor temperature reached the desired set point reactor pressure was then raised to 650 psi by charging about 151 g VDF and 23 g 2,3,3,3 tetrafluoropropene into the reactor. After reactor pressure was stabilized, 46.3 g di-N-propyl peroxy dicarbonate (NPP) initiator emulsion was added into the reactor to initiate polymerization. The initiator emulsion was 3.2 wt. % in NPP and 0.06 wt. % in ammonium perfluorooctonoate. The VDF-2,3,3,3 tetrafluoropropene copolymerization was continued until the desired amount of monomers was introduced in the reaction mass. After 120 min feed of monomers were stopped where a total of 275 g VDF and 43 g 2,3,3,3 tetrafluoropropene were charged into the reactor. Initiator feed was continued for another 30 min. The total initiator emulsion usage was 128 g. At this point initiator feed was stopped and reactor was held under agitation at 83 rpm and 83° C. for another 10 minutes. Reactor was then cooled to 35° C. and the surplus monomers were vented and the latex recovered. The solid content of the latex measured gravimetrically was 19.6 wt. %.

Example 6

Into a 2-liter stainless steel reactor was charged 1000 g of deionized water, and 5 g ammonium perfluorooctonoate. Following 5 cycles of pressurization to 40 psi with Helium and depressurization of the reactor, agitation was begun at 94 rpm and the reactor was heated to 110 C. After reactor temperature reached the desired set point reactor pressure was then raised to 650 psi by charging about 80 g VDF. After reactor pressure was stabilized, 8.7 g of a potassium persulfate/sodium acetate solution was added to the reactor to initiate polymerization. The initiator solution was 0.5 wt. % potassium persulfate and 0.5 wt. % sodium acetate in deionized water. Right after initiation a monomer mixture containing VDF and 2,3,3,3 tetrafluoropropene was fed into the reactor. The VDF-2,3,3,3 tetrafluoropropene copolymerization was continued until the desired amount of monomers was introduced in the reaction mass. After 120 min feed of monomers were stopped where a total of 273 g VDF and 22 g 2,3,3,3 tetrafluoropropene were charged into the reactor. Initiator feed was continued for another 20 min. The total initiator solution usage was 22.2 g. At this point initiator feed was stopped and reactor was held under agitation at 94 rpm and 110° C. for another 10 minutes. Reactor was then cooled to 35° C. and the surplus monomers were vented and the latex recovered. The solid content of the latex measured gravimetrically was 17.6 wt. %.

Example 7

Into a 2-liter stainless steel reactor was charged 1000 g of deionized water, and 5 g ammonium perfluorooctonoate and 3.5 g pure ethyl acetate. Following 5 cycles of pressurization to 40 psi with Helium and depressurization of the reactor, agitation was begun at 96 rpm and the reactor was heated to 110 C. After reactor temperature reached the desired set point reactor pressure was then raised to 650 psi by charging about 106 g VDF. After reactor pressure was stabilized, 6.7 g of a potassium persulfate/sodium acetate solution was added to the reactor to initiate polymerization. The initiator solution was 0.5 wt. % potassium persulfate and 0.5 wt. % sodium acetate in deionized water. Right after initiation a monomer mixture containing VDF and 2,3,3,3 tetrafluoropropene was fed into the reactor. The VDF-2,3,3,3 tetrafluoropropene copolymerization was continued until the desired amount of monomers was introduced in the reaction mass. After 210 min feed of monomers were stopped where a total of 305 g VDF and 25.1 g 2,3,3,3 tetrafluoropropene were charged into the reactor. Initiator feed was continued for another 20 min. The total initiator solution usage was 44.6 g. At this point initiator feed was stopped and reactor was held under agitation at 94 rpm and 110° C. for another 15 minutes. Reactor was then cooled to 35° C. and the surplus monomers were vented and the latex recovered. The solid content of the latex measured gravimetrically was 17.0 wt. %.

Example 8 (Comparative)

A membrane was made from a blend of poly(1-vinylphenyl-2,4-disulfonic acid-co-vinylbenzyl alcohol) polyelectrolyte and KYNAR 2801 (a copolymer of VDF and HFP that contains 10 wt % HFP). The polyelectrolyte was made as described in U.S. application 61/179,128. The polyelectrolyte had a weight average molecular weight of 200 kg/mole and polydispersity of 2.7, as determined by GPC using a mobile phase of water with 0.10 M $NaNO_3$ at 35° C. using universal calibration curve constructed from sulfonated polystyrene standards. The polyelectrolyte contained 78 mole % 1-vinylphenyl-2,4-disulfonic acid and 22 mole % vinylbenzyl alcohol, as determined by proton NMR.

160 g of a 7.12 wt % aqueous polyelectrolyte solution was combined with 27.74 g of 54.8 wt % tetrabutylammonium hydroxide (manufactured by Sachem Inc.). The solution was stirred for approximately 30 minutes and then 102.26 g of 1-methyl-2-pyrrolidinone (Biosyntheis grade solvent manufactured by EMD Chemicals). The water in the solution was removed using a rotary evaporator to produce a polyelectrolyte solution in 1-methyl-2-pyrrolidinone (solution contained 20 wt % polyelectrolyte).

10.95 g of the polyelectrolyte/1-methyl-2-pyrrolidinone solution was combined with 27.16 g of 15 wt % KYNAR 2801/1-methyl-2-pyrrolidinone solution. 0.6631 g of TRIXENE BL7982 and 0.0434 g of FASCAT 4202 was also added to the solution. TRIXENE BL7982 is an isocyanate blocked with 3,5-dimethyl pyrazole that is manufactured by Baxenden Chemicals Co. Ltd. FASCAT 4202 is an organotin catalyst manufactured by Arkema Inc. The solution was mixed for approximately 60 minutes using an overhead stirrer to produce a homogeneous solution.

The solution was cast into membrane using a Mathis LTE Labdryer. 2 mil thick aluminum foil with approximate dimensions of 15×12 inches was used as the substrate for casting. Approximately 15 g of polymer solution was spread on the foil and drawn down to a wet film thickness of about 300 micron using a doctor blade. The resulting wet film was then heated 210° C. for 6 minutes. The oven blower was set a 2000 RPM. The dry membranes were then removed from the oven and cooled to room temperature. The thickness of the dried membranes were 25-30 microns.

The membrane was released from the aluminum foil substrate by immersing it in warm deionized water. The membrane was then protonated in 3000 g of 1M aqueous hydrochloric acid. The acid solution was prepared from 18 MΩ deionized water and concentrated hydrochloric acid from EMD Chemicals (OmniTrace grade). The acid bath was heated from ambient to 86° C. over the span of approximately 75 min. The bath was then held in this temperature range for approximately 45 minutes. Subsequently, the membrane was washed in 18 MΩ deionized water and immersed in 3000 g of 1M sulfuric acid. The acid solution was prepared from 18 MΩ deionized water and concentrated sulfuric acid from EMD Chemicals (OmniTrace grade). The acid bath was heated from ambient to 82° C. over the span of approximately 75 min. The bath was then held in this temperature range for approximately 45 minutes. The membranes were removed from the sulfuric acid bath and washed with 18 MΩ deionized water to remove residual acid. The acid-form membrane was then dried at room temperature. The membrane had a peak melting point temperature of 128° C. by DSC.

Example 9

A membranes, similar to Example 8, can be made from a blend of poly(1-vinylphenyl-2,4-disulfonic acid-co-vinylbenzyl alcohol) polyelectrolyte and a copolymer of VDF and TFP containing about 15 wt % tetrafluoropropene. The polyelectrolyte is the same material described in Example 11. The polyelectrolyte/1-methyl-2-pyrolidinone solution prepared in Example 11 can be also used in this example.

10.95 g of the polyelectrolyte/1-methyl-2-pyrrolidinone solution is combined with 27.18 g of 15 wt % KYNAR 2801/1-methyl-2-pyrrolidinone solution. 0.6897 g of TRIXENE BL7982 and 0.0461 g of FASCAT 4202 is also added to the solution. The solution is mixed for 60 minutes using an overhead stirrer to produce a homogeneous solution.

The solution is cast into membrane using the method described in Example 11. The thickness of the dried membranes is about 25-30 microns.

The membrane is released from the aluminum foil substrate by immersing it in warm deionized water and it is acidified using the same procedure described in Example 11.

What is claimed is:

1. A high melting point, flexible heterogeneous copolymer composition consisting of 2 to 40 weight percent of 2,3,3,3-tetrafluoropropene (TetFP) monomer units, 60-98 weight percent of vinylidene fluoride (VDF) monomer units, and up to 10 weight percent of one or more other copolymerizable monomers, the total being 100 weight percent, wherein said composition is optically clear having a haze level of less than 30 percent, and a total white light transmission greater than 85 percent, and wherein said heterogeneous copolymer is a blend of PVDF/TetFP copolymer formed in the presence of a PVDF homopolymer, formed by charging only VDF monomer in the initial monomer charge, followed by a continuous feed consisting of VDF and TetFP monomers.

2. The copolymer of claim 1, Wherein said copolymer is branched, having at least 5% branching.

3. An article comprising the copolymer of claim 1, wherein said structure is selected from the group consisting of a film as a covering for lenses and other optical equipment; high temperature flexible clear tubes; clear see-through industrial windows, glasses, pipes, and level indicators; specialty films for solar panels, piezoelectric, and capacitor applications; fuel cell membranes, clear tough coatings, and large blown objects.

4. The copolymer of claim 1, wherein said copolymer composition comprises 0.5 to 7.6 weight percent of 2,3,3,3-tetrafluoropropene.

* * * * *